United States Patent [19]
Morales

[11] Patent Number: 5,987,526
[45] Date of Patent: Nov. 16, 1999

[54] ASYNCHRONOUS TRANSFER MODE LAYER AUTOMATIC PROTECTION SWITCHING MECHANISM FOR ATM PERMANENT VIRTUAL CONNECTIONS

[75] Inventor: Luis E. Morales, Freehold, N.J.

[73] Assignee: AT&T Corp., New York, N.Y.

[21] Appl. No.: 09/055,507

[22] Filed: Apr. 6, 1998

[51] Int. Cl.⁶ .................................................. G06F 15/16
[52] U.S. Cl. .......................................... 709/249; 370/401
[58] Field of Search ..................................... 370/401, 389, 370/395; 709/217–219, 238, 239, 249, 250

[56] References Cited

U.S. PATENT DOCUMENTS

| | | | |
|---|---|---|---|
| 4,627,070 | 12/1986 | Champlin et al. | 375/211 |
| 5,150,360 | 9/1992 | Perlman et al. | 370/402 |
| 5,440,538 | 8/1995 | Olsen | 370/228 |
| 5,537,642 | 7/1996 | Glowny et al. | 713/200 |
| 5,859,959 | 1/1999 | Kimball et al. | 395/182.02 |

*Primary Examiner*—Zarni Maung
*Assistant Examiner*—David M. Ovedovitz

[57] ABSTRACT

In accordance with an embodiment of the present invention, a first asynchronous transfer mode network is provided, adapted to couple with a first entity external to the network, the first entity having a fourth port and a fifth port. The network has a first port. The network also has a second port coupled to the first port by a first permanent virtual connection, and the second port is coupled to the fourth port via a first interface. The network also has a third port coupled to said first port by a second permanent virtual connection, and the third port is coupled to the fifth port via a second interface. Packets are sent between the first port and the second port via the first permanent virtual connection, and between the second port and the fourth port via the first interface until a failure is detected, the failure occurring at the first interface, the second port, or the fourth port. After a failure is detected, packets are sent between the first port and the third port via the second permanent virtual connection, and between the third port and the fifth port via the second interface.

28 Claims, 4 Drawing Sheets

ASYNCHRONOUS TRANSFER MODE LAYER AUTOMATIC PROTECTION SWITCHING MECHANISM FOR ATM PERMANENT VIRTUAL CONNECTIONS

BACKGROUND OF THE INVENTION

An asynchronous transfer mode network ("ATM network") is made of a plurality of switches, each of which is coupled directly to at least one other switch. The points at which data enters and exits a switch are referred to as "ports."

ATM networks use virtual connections to send data across the network. A virtual connection is basically a path or a circuit between two switches in an ATM network that may be routed through any number of intermediate switches. Before sending a data packet to the next switch along the virtual connection, a switch attaches a header to the data packet that contains a virtual channel identifier and a virtual path identifier ("VCI/VPI"), which allows the next switch along the virtual connection to identify which virtual connection the packet is traversing. The VCI/VPI is unique to a particular virtual connection along a particular leg of the connection, but need not remain constant between different legs, i.e., the VCI/VPI may be changed at each switch.

A virtual connection may be set up for a particular data transmission having multiple data packets, such that each data packet in the transmission is sent along the virtual connection, which is then deactivated once the transmission is complete. Alternatively, a virtual connection may be a permanent virtual connection ("PVC"), which is used for multiple data transmissions.

Failures within an ATM network are typically resolved by a network management system ("NMS"). Each switch in the network is in contact with the NMS, and reports failures to the NMS. When a failure within the network is reported, the NMS reroutes virtual connections around the failure. The NMS may also have the capability to detect failures at the boundary or outside of the NMS's ATM network, but is typically not able to resolve such failures, particularly when networks made by different vendors are involved. Such a failure might occur at an interface, which is used to couple the ATM network to an entity external to the network, or at a port to which the interface is coupled. After such a failure is detected, the NMS may declare the interface and any PVC coupled to the interface in a failed state. Once a failed state is declared, manual intervention may be required to restore the PVC.

As ATM networks grow in popularity and are used in a wider variety of applications, interfaces between ATM networks and entities external to the ATM network are being created and used with increasing frequency. Accordingly, there is an increasing need for a way to resolve failures at these interfaces and the ports to which they are coupled.

Physical layer protection is one method of resolving failures at interfaces between networks, and the ports to which the interfaces are coupled. For example, an active interface between networks may be associated with a second interface reserved for use in case the active interface fails. This second interface may remain inactive until there is a failure, or the same data may be transmitted along both interfaces simultaneously such that a failure in one does not prevent transmission along the other. However, this type of physical layer protection approximately doubles the bandwidth required for a particular data transmission between networks, as it requires one interface to be dedicated to protection for each active interface. Alternatively, a single interface between networks may have a Y-cable or other means of splitting the signal at one or both ends, such that a failure after the split does not prevent transmission. However, this type of physical layer protection also uses excess bandwidth in that it requires four ports, two active and two dedicated to protection, for each active interface. In addition, this type of physical layer protection does not protect against a failure along the interface where the signal is not split.

SUMMARY OF THE INVENTION

In accordance with an embodiment of the present invention, a first asynchronous transfer mode network is provided, adapted to couple with a first entity external to the network, the first entity having a fourth port and a fifth port. The network has a first port. The network also has a second port coupled to the first port by a first permanent virtual connection, and the second port is coupled to the fourth port via a first interface. The network also has a third port coupled to the first port by a second permanent virtual connection, and the third port is coupled to the fifth port via a second interface. Packets are sent between the first port and the second port via the first permanent virtual connection, and between the second port and the fourth port via the first interface until a failure is detected, the failure occurring at the first interface, the second port, or the fourth port. After a failure is detected, packets are sent between the first port and the third port via the second permanent virtual connection, and between the third port and the fifth port via the second interface.

In accordance with an embodiment of the present invention, a first asynchronous transfer mode network is provided, adapted to couple with a second asynchronous transfer mode network, the second asynchronous transfer mode network having a fourth port and a fifth port. The first network has a first port. The first network also has a second port coupled to the fourth port via a first interface. The first network also has a third port coupled to the fifth port via a second interface. The second and third ports are adapted to receive outgoing packets from the first port via a first permanent virtual connection having a logical split, and are adapted to send incoming packets to the first port via a second permanent virtual connection having a logical merge. The first port sends the outgoing packets to the second and third ports via the first permanent virtual connection, the second port sends the outgoing packets toward the second network via the first interface, and the third port sends the outgoing packets toward the second network via the second interface. The second port receives the incoming packets via the first interface and sends the incoming packets to the first port via the second permanent virtual connection until a failure is detected, the failure occurring at at least one of the first interface, the second port and the fourth port. After a failure is detected, the third port receives the incoming packets via the second interface and sends the incoming packets to the first port via the second permanent virtual connection.

In accordance with an embodiment of the present invention, a process for increasing the reliability of data transmission between a first asynchronous transfer mode network and an entity external to the first network, the external entity having a fourth port and a fifth port, is provided. To carry out the process, first provision a first PVC within the first network that couples a first port to a second port. Second, provision a second PVC within the first network that couples the first port to a third port. Third, send data packets from the first port to the second port via the first permanent virtual connection within the first network, and then to the fourth port via a first interface, the first interface coupling the second port to the fourth port. Fourth, monitor for a failure at at least one of the first interface, the second port, and the fourth port. If no failure is detected, repeat the third and fourth steps of sending data packets from the first port to the second port and monitoring for a failure. If a failure is detected, send the data packets from the first port to the third port via the second permanent virtual connection within the first network, and then to the fifth port via a second interface, the second interface coupling the third port to the fifth port.

DETAILED DESCRIPTION

Figure 1:
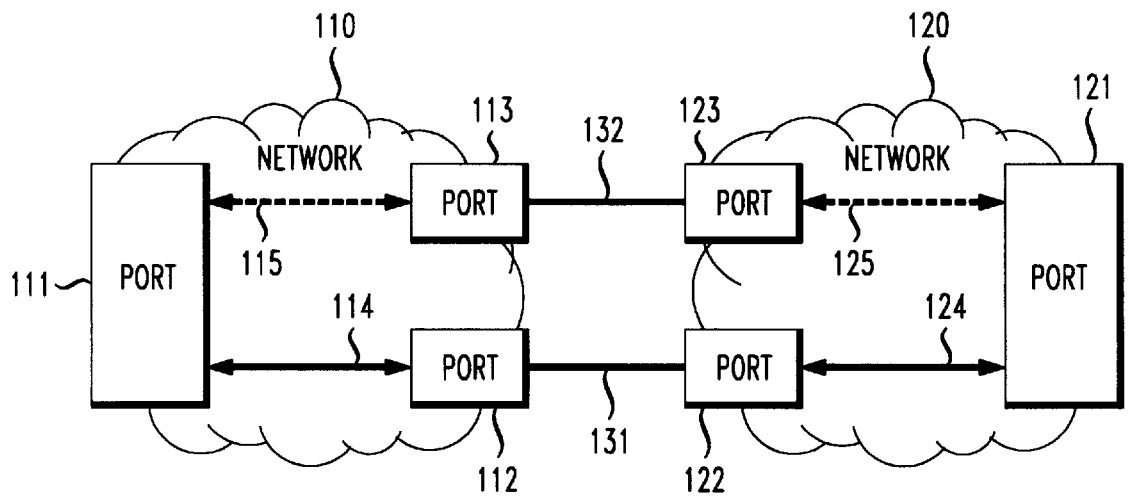
FIG. 1 shows an ATM network coupled to another ATM network in accordance with an embodiment of the present invention.

An embodiment of the present invention increases the reliability of data transmission between an asynchronous transfer mode ("ATM") network and an entity external to the ATM network, such as a second ATM network, a switch, or customer premises equipment. In particular, where there is more than one interface between the ATM network and the external entity, the ATM network is configured such that data initially transmitted between the ATM network and the external entity via one of the interfaces may be automatically rerouted to another interface in the event of a failure at the interface initially used or at the ports to which the initial interface is coupled, without the intervention of the ATM's network management system ("NMS") or a network operator. This is accomplished by provisioning within the ATM network a first permanent virtual connection ("PVC") that couples a first port to a second port within the ATM, where the second port is coupled to the external entity by a first interface, and a second PVC that couples the first port to a third port within the ATM, where the third port is coupled to the external entity by a second interface. This provisioning may be accomplished by any means known to the art. Initially, the first PVC and the first interface are used to transmit data from the first port to the external entity, while the second PVC is provisioned but not actually used to transmit data, such that network resources remain available for other uses. Similarly, the second interface remains available for other uses. Note that provisioning the second PVC does use a minimal amount of network resources, in that virtual channel identifiers and virtual path identifiers ("VCI/VPI") of the second PVC are reserved, but not used, throughout the network. If a failure is detected, the data is automatically rerouted to the second PVC and the second interface. Preferably, the external entity is also configured to automatically switch over to the second interface in the event of a failure at the first interface.

In accordance with an embodiment of the present invention, it may be preferable to wait for a period of time before rerouting data to the second PVC and the second interface. For example, if there is some other failure correction mechanism, such as physical layer protection, that might correct the failure, it is preferable to wait a period of time to give the other failure correction mechanism an opportunity to correct the failure before rerouting the data. Physical layer protection typically detects and resolves failures in less than 10 milliseconds, so if there is physical layer protection, it is preferable to wait for a period of time that is at least about 10 milliseconds before rerouting data. In addition, if an interface is susceptible to intermittent failures, it is preferable to wait for a period of time longer than the duration of a typical intermittent failure, referred to as a "soaking time," before rerouting data, to avoid toggling between the first and second PVC. This soaking time is preferably less than about 10 milliseconds. If there is no physical layer protection, and an embodiment of the present invention is being used instead, it is preferable that the period of time waited before rerouting data is as short as possible.

However, a timer of an embodiment of the present invention may be implemented on the NMS or some other location removed from the failure detection mechanism, and there may be a communication lag between the timer and the failure detection mechanism. It is therefore preferable to wait for a period of time greater than about 50–250 milliseconds before rerouting data to allow any signal reporting that the failure has been resolved to reach the timer.

In addition, if two networks are practicing an embodiment of the present invention, and one of the networks is able to detect failures and reroute data significantly faster than the other, it is preferable that both networks reroute data at approximately the same time. It is therefore preferable to have the faster network wait for a period of time before rerouting data to compensate for the difference in speed. This synchronization time is preferably up to about 10 seconds.

Many networks have an NMS capable of detecting failures at interfaces. The NMS will typically respond a few seconds after such a failure occurs by declaring any PVC that transmits data to or from the failed interface in a failed state. Such a declaration may interfere with the efficient implementation of an embodiment of the present invention, so it is preferable that data be rerouted to the second PVC and second interface before any such response. It is therefore preferable to wait a period of time (about 50 milliseconds to about 10 seconds) before rerouting data, and more preferably to wait not more than about 5 seconds.

The term "couple" is used throughout in its broadest sense. For example, a PVC that "couples" two ports may pass through a plurality of switches, and data packets that are transmitted along such a PVC may have their headers changed along the way.

FIG. 1 shows an embodiment of the present invention that increases the reliability of data transmission between two asynchronous transfer mode networks. A network 110 has ports 111, 112 and 113. Port 111 is coupled to port 112 by a PVC 114. Port 111 is coupled to port 113 by a PVC 115. Similarly, network 120 has ports 121, 122 and 123. Port 121 is coupled to port 122 by a PVC 124. Port 121 is coupled to port 123 by a PVC 125.

Port 112 is coupled to port 122 by interface 131. Port 113 is coupled to port 123 by interface 132. Interfaces 131 and 132 may be any interface known to the art for coupling ATM networks. For example, interfaces 131 and 132 may be interfaces that comply with the DS3 or OC3 standards as established by ANSI (American National Standards Institute). Interfaces 131 and 132 need not be the same type of interface and need not transmit data at the same rate.

The embodiment of FIG. 1 increases the reliability of data transmission between network 110 and network 120. Specifically, the reliability of data transmission between port 111 and port 121 is increased. Data packets are initially sent between ports 111 to port 112 via PVC 114, between ports 112 and 122 via interface 131, and between ports 122 and 121 via PVC 124. At this point, virtual channel identifiers and virtual path identifiers ("VCI/VPI") for PVC 115 are reserved through network 110, however, data is not transmitted along PVC 115. Similarly, VCI/VPIs are reserved for PVC 125 through network 120 but data is not transmitted along PVC 125. Interface 132 is not used for the data transmission between port 111 and port 121 at this point, and is available for other uses.

If there is a failure at interface 131, port 112, or port 122, data can no longer be transmitted between ports 111 and 121 via its initial route. Preferably, such a failure would be detected by physical layer alarms and/or hardware alarms. If the period of time expires and the failure has not cleared, network 110 deactivates PVC 114 and activates PVC 115, i.e., packets previously sent between ports 111 and 112 via PVC 114 are now sent between ports 111 and 113 via PVC 115. Network 120 operates in a similar manner. After a failure is detected, network 120 deactivates PVC 124 and activates PVC 125, i.e., packets previously sent between ports 121 and 122 via PVC 124 are now sent between ports 121 and 123 via PVC 125. As a result, if there is a failure at interface 131, port 112, or port 122, data packets are transmitted between ports 111 and 113 via PVC 115, between ports 113 and 123 via interface 132, and between ports 123 and 121 via PVC 125, thereby avoiding the failure.

Because networks 110 and 120 operate in a similar manner, both networks begin using interface 132 instead of interface 131 at approximately the same time. However, the period of time that network 110 waits before activating PVC 115 and the period of time that network 120 waits before activating PVC 125 need not be the same, but are preferably similar to minimize packet loss and/or the use of buffers at ports 113 and 123.

The same VCI/VPI cannot be simultaneously used at the same port for two different virtual connections. However, some ports have the capability to use a VCI/VPI for one virtual connection and at the same time reserve that VCI/VPI for use by another virtual connection, which is held inactive pending the availability of the VCI/VPI. For example, the Newbridge Mainstreet 36170 switch, available from Newbridge Networks Inc. in Herndon, Va., has this capability. Preferably, port 111 has this capability, and the VCI/VPI used by PVC 114 is reserved for use by PVC 115, and PVC 115 is held inactive pending the availability of the VCI/VPI. PVC 114 uses the VCI/VPI until a failure is detected at interface 131, port 112 or port 122, and the failure does not clear itself, at which point PVC 114 is deactivated, which makes the VCI/VPI previously used by PVC 114 available, such that PVC 115 is automatically activated. While the use of the same VCI/VPI for two PVCs leaving the same port is described with respect to the embodiment of FIG. 1, this feature may be practiced in conjunction with other embodiments of the present invention.

Preferably, the respective network management systems ("NMS") of networks 110 and 120 are made aware of the relationship between the PVCs when the PVCs are provisioned. For example, the NMS of network 110 is preferably aware that PVC 114 is initially an active PVC, and that PVC 115 is initially an inactive PVC serving as a backup for PVC 114. In addition, the NMS is preferably made aware of any change in status, such as a failure and the subsequent deactivation of PVC 114 and the activation of PVC 115.

When the failure is eventually corrected, steps may be taken by the NMS and/or network operators of networks 110 and 120 to revert to the original route for data transmission between ports 111 and 121, i.e, the route including interface 131. This approach would be preferable if interface 131 is better suited than interface 132 for the data transmission, for example if interface 131 is capable of transmitting at rates different than interface 132, or if interface 131 is utilized less than interface 132. Alternatively, the use of interface 132 to transmit data between ports 111 and 121 may be continued even after the failure is corrected. In that case, it is preferable that PVC 114, interface 131 and PVC 124 are available for the transmission of data in the event that interface 132, port 113 or port 123 fails in the same way that PVC 115, interface 132 and PVC 125 were available for data transmission in the event that interface 131, port 112 or port 122 failed. While the choice of which interface to use after a failure is corrected is described with respect to the embodiment of FIG. 1, this feature may be practiced in conjunction with other embodiments of the present invention.

Figure 2:
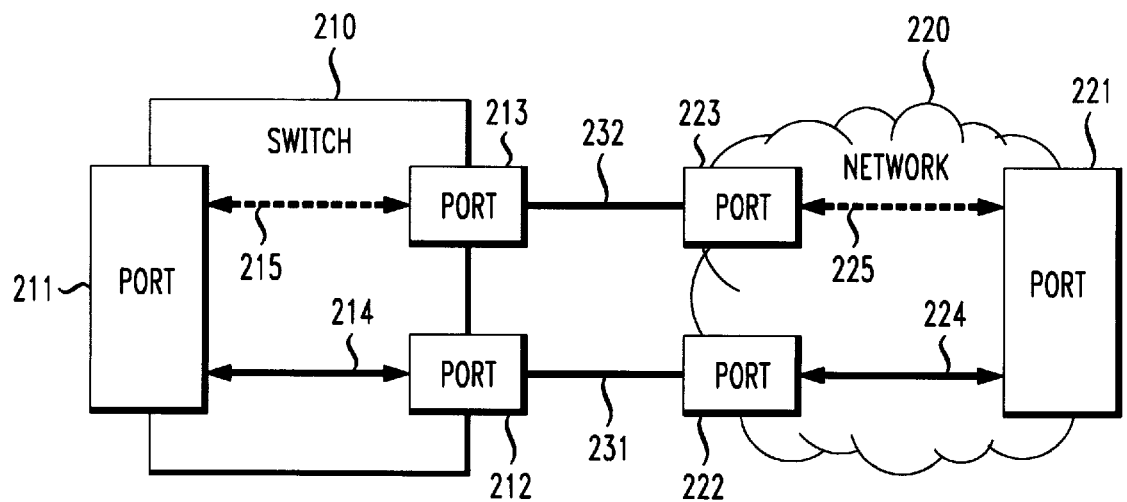
FIG. 2 shows a switch coupled to an ATM network in accordance with an embodiment of the present invention.

FIG. 2 shows an embodiment of the present invention as practiced within a single switch 210 to increase the reliability of data transmission between switch 210 and network 220. A switch 210 has ports 211, 212 and 213. Port 211 is coupled to port 212 by a PVC 214. Port 211 is coupled to port 213 by a PVC 215. Similarly, network 220 has ports 221, 222 and 223. Port 221 is coupled to port 222 by a PVC 224. Port 221 is coupled to port 223 by a PVC 225.

Port 212 is coupled to port 222 by interface 231. Port 213 is coupled to port 223 by interface 232. Interfaces 231 and 232 may be any interface known to the art for coupling ATM networks. For example, interface 231 and 232 may be DS3 lines or OC3 lines. Interfaces 231 and 232 need not be the same type of interface and need not transmit data at the same rate.

The embodiment of FIG. 2 increases the reliability of data transmission between switch 210 and network 220. Specifically, the reliability of data transmission between port 211 and port 221 is increased. Data packets are initially sent between ports 211 to port 212 via PVC 214, between ports 212 and 222 via interface 231, and between ports 222 and 221 via PVC 224. At this point, a VCI/VPI for PVC 215 is reserved in switch 210, however, data is not transmitted along PVC 215. Similarly, VCI/VPIs are reserved for PVC 225 through network 220 but data is not transmitted along PVC 225. Interface 232 is not used for the data transmission between port 211 and port 221 at this point, and is available for other uses.

If there is a failure at interface 231, port 212 or port 222, data can no longer be transmitted between ports 211 and 221 via its initial route. Preferably, such a failure would be detected by physical layer alarms and/or hardware alarms. After a failure is detected, switch 210 deactivates PVC 214 and activates PVC 215, i.e., packets previously sent between ports 211 and 212 via PVC 214 are now sent between ports 211 and 213 via PVC 215. Network 220 operates in a similar manner. After a failure is detected, network 220 deactivates PVC 224 and activates PVC 225, i.e., packets previously sent between ports 221 and 222 via PVC 224 are now sent between ports 221 and 223 via PVC 225. As a result, if there is a failure at interface 231, port 212 or port 222, data packets are transmitted between ports 211 and 213 via PVC 215, between ports 213 and 223 via interface 232, and between ports 223 and 221 via PVC 225, thereby avoiding the failure.

Because switch 210 and network 220 operate in a similar manner, both switch 210 and network 220 begin using interface 232 instead of interface 231 at approximately the same time. However, the period of time that network 210 waits before activating PVC 215 and the period of time that network 220 waits before activating PVC 225 need not be the same, but are preferably similar to minimize packet loss and/or the use of buffers at ports 213 and 223.

Ports 212 and 213 may be collocated on the same shelf of switch 210. However, it is preferable to locate ports 212 and 213 on different shelves, because some failures may extend beyond a single port to all ports on a particular shelf. In addition, an entire shelf may be disabled for maintenance or upgrade purposes. If ports 212 and 213 are located on different shelves, failures that affect an entire shelf do not simultaneously cause failures at ports 212 and 213.

Figure 3:
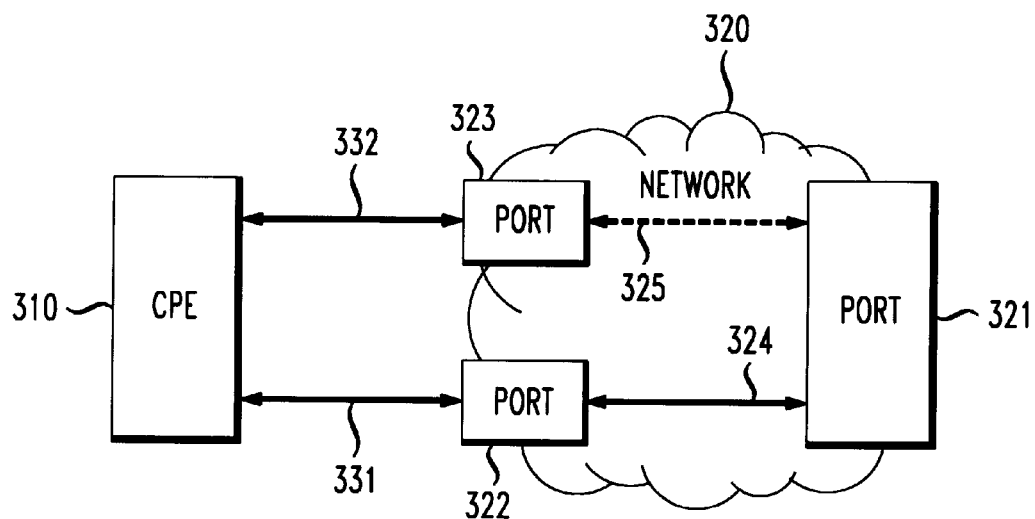
FIG. 3 shows an ATM network coupled to customer premises equipment in accordance with an embodiment of the present invention.

FIG. 3 shows an embodiment of the present invention as practiced in a network coupled to customer premises equipment that increase the reliability of data transmission between network customer premises equipment ("CPE") 310 and network 320. Network 320 has ports 321, 322 and 323. Port 321 is coupled to port 322 by a PVC 324. Port 321 is coupled to port 323 by a PVC 325.

CPE 310 is coupled to port 322 by interface 331. CPE 310 is also coupled to port 323 by interface 332. Interfaces 331 and 332 may be any interface known to the art for coupling CPE to a network. For example, interfaces 331 and 332 may be DS3 lines or OC3 lines. Interfaces 331 and 332 need not be the same type of interface and need not transmit data at the same rate.

The embodiment of FIG. 3 increases the reliability of data transmission between CPE 310 and network 320. Specifically, the reliability of data transmission between CPE 310 and port 321 is increased. Data packets are initially sent between CPE 310 and port 322 via interface 331, and between ports 322 and 321 via PVC 324. At this point, VCI/VPIs are reserved for PVC 325 through network 320 but data is not transmitted along PVC 325. Interface 332 is not used for the data transmission between CPE 310 and port 321 at this point, and is available for other uses.

If there is a failure at interface 331, the coupling between CPE 310 and interface 331 or at port 322, data can no longer be transmitted between CPE 310 and port 321 via its initial route. Preferably, such a failure would be detected by physical layer alarms and/or hardware alarms. After a failure is detected, network 320 deactivates PVC 324 and activates PVC 325, i.e., packets previously sent between ports 321 and 322 via PVC 324 are now sent between ports 321 and 323 via PVC 325. As a result, if there is a failure, data packets are transmitted between ports 321 and 113 via PVC 325, and between ports 323 and CPE 310 via interface 332, thereby avoiding the failure.

Similarly, CPE 310 must have a mechanism for detecting the failure, and for communicating with network 320 via interface 332 instead of interface 331 in the event of an uncleared failure.

Figure 4:
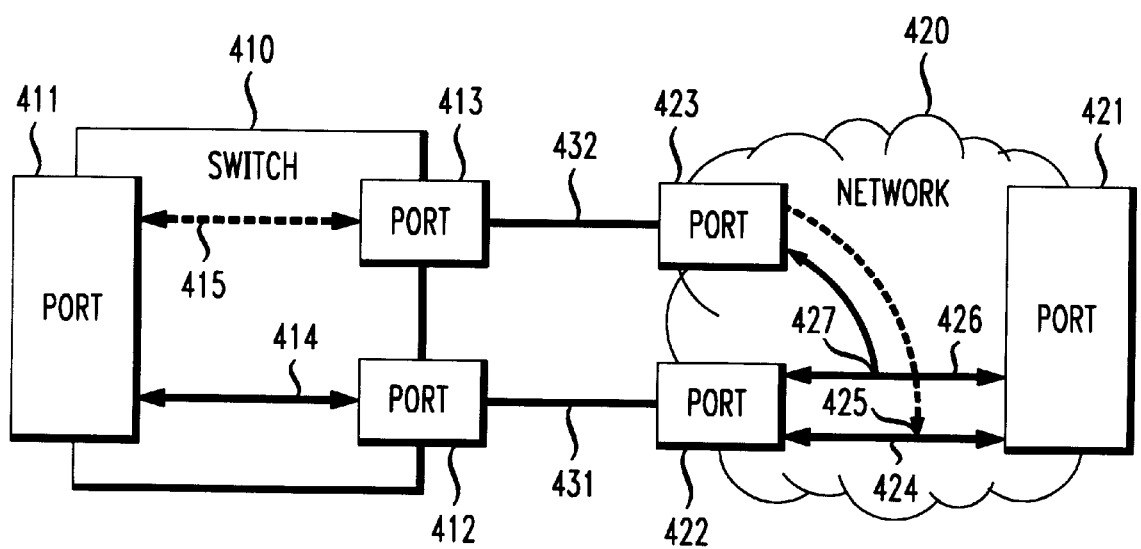
FIG. 4 shows an ATM network coupled to another ATM network in accordance with an embodiment of the present invention.

FIG. 4 shows an embodiment of the present invention that increases the reliability of a data transmission between two asynchronous transfer mode networks. The embodiment of FIG. 4 shows how the invention may be practiced by a network 420 having switches, such as a switch including port 421, that do not have the capability to use a VCI/VPI for one virtual connection and at the same time reserve that VCI/VPI for use by another virtual connection. A network 410 has ports 411, 412 and 413. Port 411 is coupled to port 412 by a PVC 414. Port 411 is coupled to port 413 by a PVC 415. Similarly, network 420 has ports 421, 422 and 423. Ports 422 and 423 can send data to port 421 via PVC 424. PVC 424 has a logical merge 425, such that data sent from either port 422 or port 423 via PVC 424 will be transmitted to port 421. Port 421 can send data packets to ports 422 and 423 via PVC 426. PVC 426 has a logical split 427, such that the data sent from port 421 via PVC 426 is transmitted to both port 422 and port 423.

Port 412 is coupled to port 422 by interface 431. Port 413 is coupled to port 423 by interface 432. Interfaces 431 and 432 may be any interface known to the art for coupling ATM networks. For example, interfaces 431 and 432 may be DS3 lines or OC3 lines. Interfaces 431 and 432 need not be the same type of interface and need not transmit data at the same rate.

The embodiment of FIG. 4 increases the reliability of data transmission between network 410 and network 420. Specifically, the reliability of data transmission between port 411 and port 421 is increased. Data packets are initially sent between ports 411 to port 412 via PVC 414, between ports 412 and 422 via interface 431, from port 422 to port 421 via PVC 424, and from port 421 to port 422 via PVC 426. PVC 424 has a logical merge 425 such that data packets may also be sent from port 423 to port 421 via PVC 424, although there are no data packets sent from port 423 initially. PVC 426 has a logical split 427 such that data packets sent from port 421 to port 422 are also sent to port 423. Port 423 then sends the data packets received from port 421 to port 413 via interface 432. Initially, PVC 415 is inactive, and port 413 discards these data packets. At this point, VCI/VPIs for PVC 415 are reserved through network 410; however, data is not transmitted along PVC 415.

If there is a failure at interface 431, port 412 or port 422, data can no longer be transmitted between ports 411 and 421 via its initial route. Preferably, such a failure would be detected by physical layer alarms and/or hardware alarms. After a failure is detected, network 410 deactivates PVC 414 and activates PVC 415, i.e., packets previously sent between ports 411 and 412 via PVC 414 are now sent between ports 411 and 413 via PVC 415. Data packets arriving at port 413 from port 411 via PVC 415 are then sent to port 423 via interface 432.

Network 420 is configured such that it does not need to do anything in the event of a failure. The data packets that were previously transmitted from port 412 to port 422 via interface 431, and then to port 421 via PVC 424, are now transmitted from port 413 to port 423 via interface 432 and then to port 421 via PVC 424. Logical merge 425 allows PVC 424 to transmit data packets to 421 whether they are transmitted from port 422 or port 423. The data packets that were previously transmitted from port 422 to port 412 are now blocked by the failure. However, because PVC 415 has been activated, the data packets that were previously discarded at port 413 after being transmitted to port 413 from port 423 via interface 432 are no longer discarded, and are instead sent to port 411 via PVC 415. As a result, if there is a failure interface 431, port 412 or port 422, data packets are transmitted between ports 411 and 413 via PVC 415, from port 413 to port 423 via interface 432, from port 413 to port 421 via PVC 424, and from port 421 to port 423 via PVC 426, thereby avoiding the failure.

Due to the configuration of network 420, the deactivation of PVC 414 and activation of PVC 415 by network 410 are the only steps required to reroute data transmissions previously sent between networks 410 and 420 from interface 431 to interface 432.

Figure 5:
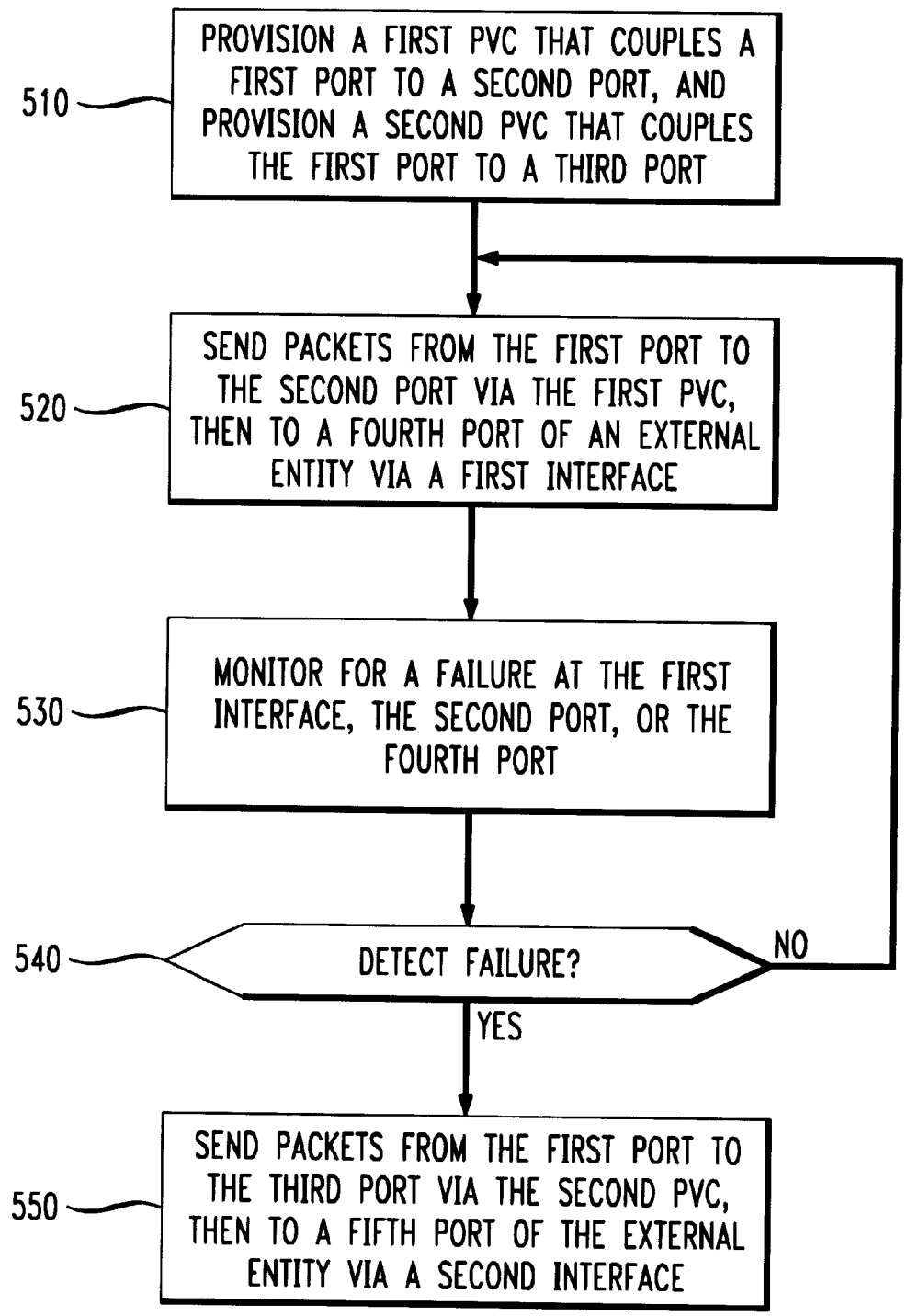
FIG. 5 shows a flowchart describing an embodiment of the present invention.

FIG. 5 shows a flowchart describing the practice of an embodiment of the present invention. In a step 510, a first PVC is provisioned coupling a first port to a second port, and a second PVC is provisioned coupling the first port to a third port, all within a first ATM network. In a step 520, data packets are sent from the first port to the second port via the first PVC, and then to a fourth port of an entity external to the first ATM via a first interface. At this point, data packets are not transmitted via the second PVC. In a step 530, the first interface, as well as the second port and the fourth port, are monitored for a failure. Preferably, this monitoring is passive, i.e., the network need only maintain the capability to be made aware of the failure. A step 540 is a decision step. If no failure is detected, the process returns to step 520. Optionally, step 540 may require a failure to persist for a period of time to be considered a failure, and the process returns to step 520 if the failure is corrected before the period of time expires. If the failure is not corrected, the process proceeds to a step 550. In step 550, the data packets are sent from the first port to a third port via a second PVC, and then to a fifth port of the external entity via a second interface. The data packets are no longer sent via the first PVC at this point.

The external entity may be a second asynchronous transfer mode network, customer premises equipment, or any other entity to which the first asynchronous transfer mode network might be coupled. The first and second interfaces may be any interface known to the art for coupling ATM networks. For example the interfaces may be DS3 lines or OC3 lines. The interfaces need not be the same type of interface and need not transmit data at the same rate. The second and third ports may be located on different shelves of the same switch, the same shelf of a switch, or on different switches. The failure may be detected by physical layer alarms, a hardware failure indication, or any other method known for detecting failures. Preferably, the first and second PVC use the same VCI/VPI at the first port as described with reference to the embodiment of FIG. 1.

Figure 6:
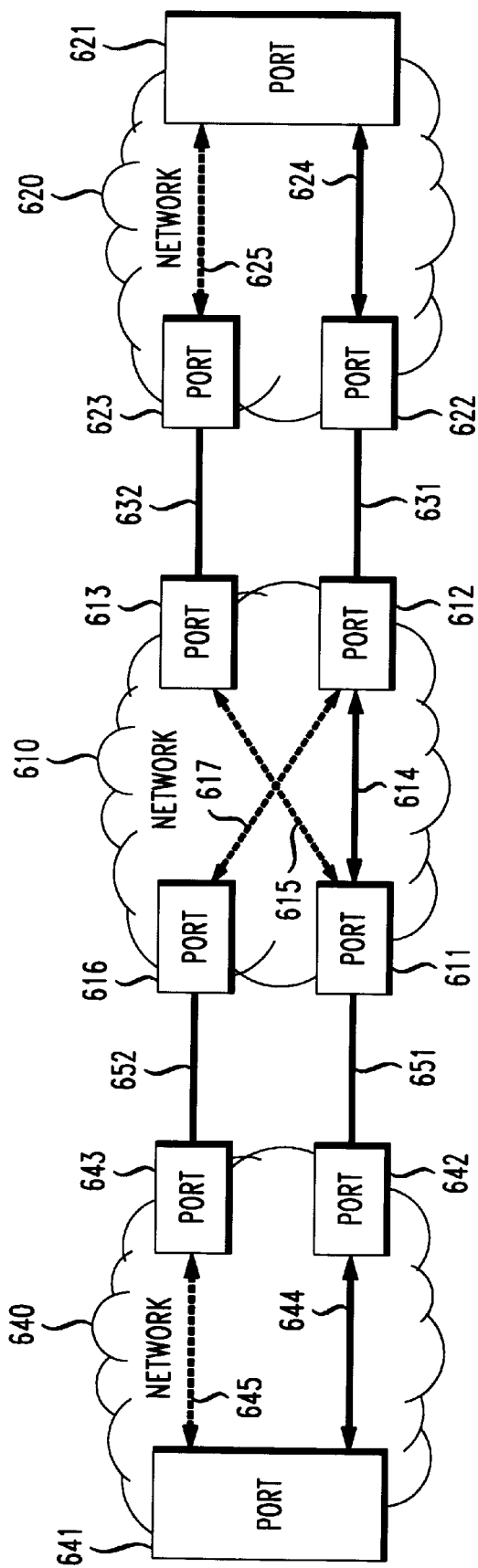
FIG. 6 shows an ATM network coupled to two other ATM networks in accordance with an embodiment of the present invention.

FIG. 6 shows an embodiment of the present invention as practiced at both ends of a PVC 614. Networks 610 and 620, ports 611, 612, 613, 621, 622, and 623, PVCs 614, 615, 624 and 625, and interfaces 631 and 632 are coupled and operate analogously to networks 110 and 120, ports 111, 112, 113, 121, 122, and 123, PVCs 114, 115, 124 and 125, and interfaces 131 and 132, respectively, of the embodiment of FIG. 1. In addition, network 610 has a port 616 coupled to port 612 by a PVC 617. A network 640 has ports 641, 642 and 643. Port 641 is coupled to port 642 by a PVC 644. Port 641 is coupled to port 643 by a PVC 645. Networks 610 and 640, ports 612, 611, 616, 641, 642, and 643, PVCs 614, 617, 644 and 645, and interfaces 651 and 652 are coupled and operate analogously to networks 110 and 120, ports 111, 112, 113, 121, 122, and 123, PVCs 114, 115, 124 and 125, and interfaces 131 and 132, respectively, of the embodiment of FIG. 1. As a result, if there is a failure at interface 631, port 612 or port 622, data packets are transmitted between ports 611 and 613 via PVC 615, between ports 613 and 623 via interface 632, and between ports 623 and 621 via PVC 625, thereby avoiding the failure. Similarly, if there is a failure at interface 651, port 611 or port 642, data packets are transmitted between ports 612 and 616 via PVC 617, between ports 616 and 643 via interface 652, and between ports 643 and 641 via PVC 645, thereby avoiding the failure.

The present invention may be practiced across any number of networks in accordance with the embodiment of FIG. 6.

An embodiment of the present invention therefore allows data transmissions between an ATM and an entity external to the ATM coupled by more than one interface to be automatically rerouted around a failed interface, without the intervention of the NMS or network operator.

Several embodiments of the present invention are specifically described and/or illustrated herein. However, it will be appreciated that modifications and variations of these embodiments are within the spirit and intended scope of the present invention, and are within the purview of the appended claims.

What is claimed is:

1. A first asynchronous transfer mode network, adapted to couple with a first entity external to the network, the first entity having a fourth port and a fifth port, comprising:

a first port;

a second port coupled to said first port by a first permanent virtual connection, wherein said second port is coupled to the fourth port via a first interface; and a third port coupled to said first port by a second permanent virtual connection, wherein said third port is coupled to the fifth port via a second interface;

wherein packets are sent between said first port and said second port via the first permanent virtual connection, and between said second port and the fourth port via the first interface until a failure is detected, the failure occurring at at least one of the first interface, said second port, and the fourth port, whereupon packets are sent between said first port and said third port via the second permanent virtual connection, and between said third port and the fifth port via the second interface.

2. The first asynchronous transfer mode network of claim 1, wherein the first entity is a second asynchronous transfer mode network.

3. The first asynchronous transfer mode network of claim 1, wherein the first entity is customer premises equipment.

4. The first asynchronous transfer mode network of claim 1, where in the first interface and second interface operate at different rates.

5. The first asynchronous transfer mode network of claim 1, wherein said second port is located on a first shelf of a switch of the first asynchronous transfer network, and said second port is located on a second shelf of the switch.

6. The first asynchronous transfer mode network of claim 1, wherein the failure must persist for a period of time before packets are sent between said first port and said third port via the second permanent virtual connection, and between said third port and the first entity via the second interface.

7. The first asynchronous transfer mode network of claim 6, wherein the period of time is greater than about 50 milliseconds.

8. The first asynchronous transfer mode network of claim 7, wherein the period of time is about 50 milliseconds to about 5 seconds.

9. The first asynchronous transfer mode network of claim 1, wherein the failure is detected by physical layer alarms.

10. The first asynchronous transfer mode network of claim 1, wherein the failure is detected by a hardware failure indication.

11. The first asynchronous transfer mode network of claim 1, wherein the failure occurs at the first interface.

12. The first asynchronous transfer mode network of claim 1, wherein the failure occurs at the second port.

13. The first asynchronous transfer mode network of claim 1, wherein the failure occurs at the fourth port.

14. The first asynchronous transfer mode network of claim 1, wherein the first and second permanent virtual connections use the same virtual channel identifier at said first port.

15. The first asynchronous transfer mode network of claim 1, wherein the first network is also adapted to couple with a second entity external to the network, the second entity having a seventh port and an eighth port, further comprising:

a sixth port coupled to said second port by a third permanent virtual connection;

wherein said first port is coupled to the seventh port by a third interface;

wherein said sixth port is coupled to the eighth port via a fourth interface; and wherein said second port sends packets to said first port via the first permanent virtual connection and said first port sends the packets to the seventh port via the third interface until a failure is detected, the failure occurring at at least one of the third interface, said first port, and the seventh port, whereupon said second port sends the packets to said sixth port via the third permanent virtual connection, and the sixth port sends the packets to the eighth port via the fourth interface.

16. The first asynchronous transfer mode network of claim 1, wherein said first, second and third ports are all located within a switch of the first network.

17. A first asynchronous transfer mode network, adapted to couple with a second asynchronous transfer mode network, the second asynchronous transfer mode network having a fourth port and a fifth port, comprising:

a first port;

a second port coupled to the fourth port via a first interface; and a third port coupled to the fifth port via a second interface;

wherein said second and third ports are adapted to receive outgoing packets from said first port via a first permanent virtual connection having a logical split, and adapted to send incoming packets to said first port via a second permanent virtual connection having a logical merge;

wherein said first port sends the outgoing packets to said second and third ports via said first permanent virtual connection, said second port sends the outgoing packets toward the second network via the first interface, and said third port sends the outgoing packets toward the second network via the second interface; and wherein said second port receives the incoming packets via the first interface and sends the incoming packets to said first port via the second permanent virtual connection until a failure is detected, the failure occurring at at least one of the first interface, said second port and the fourth port, whereupon said third port receives the incoming packets via the second interface and sends the incoming packets to said first port via the second permanent virtual connection.

18. A process for increasing the reliability of data transmission between a first asynchronous transfer mode network and an entity external to the first network, the external entity having a fourth port and a fifth port, comprising the steps of:

provisioning a first PVC within the first network that couples a first port to a second port;

provisioning a second PVC within the first network that couples the first port to a third port;

sending data packets from the first port to the second port via the first permanent virtual connection within the first network, and then to the fourth port via a first interface, the first interface coupling the second port to the fourth port;

monitoring for a failure at at least one of the first interface, the second port, and the fourth port;

if no failure is detected, repeating said steps of sending data packets from the first port to the second port and monitoring for a failure;

if a failure is detected, sending the data packets from the first port to the third port via the second permanent virtual connection within the first network, and then to the fifth port via a second interface, the second interface coupling the third port to the fifth port.

19. The process of claim 18, wherein the entity is a second asynchronous transfer mode network.

20. The process of claim 18, wherein the entity is customer premises equipment.

21. The process of claim 18, wherein the first interface and second interface operate at different rates.

22. The process of claim 18, wherein the second port is located on a first shelf of a switch of the first network, and said second port is located on a second shelf of the switch.

23. The process of claim 18, wherein the failure must persist for a period of time to be considered a detected failure.

24. The process of claim 23, wherein the period of time is greater than about 50 milliseconds.

25. The process of claim 24, wherein the period of time is about 50 milliseconds to about 5 seconds.

26. The process of claim 18, wherein the failure is detected by physical layer alarms.

27. The process of claim 18, wherein the failure is detected by a hardware failure indication.

28. The process of claim 18, wherein packets leaving said first port have a virtual channel identifier that is identical whether said packets are sent via the first permanent virtual connection or the second permanent virtual connection.

* * * * *